(12) United States Patent
Che

(10) Patent No.: US 10,778,453 B2
(45) Date of Patent: Sep. 15, 2020

(54) SYSTEM AND APPARATUS FOR PREVENTING FAULTY CONNECTION BETWEEN POC AND POE

(71) Applicant: ATEN International Co., Ltd., New Taipei (TW)

(72) Inventor: Jian-Liang Che, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 438 days.

(21) Appl. No.: 15/714,193

(22) Filed: Sep. 25, 2017

(65) Prior Publication Data

US 2018/0091321 A1 Mar. 29, 2018

(30) Foreign Application Priority Data

Sep. 26, 2016 (TW) .............................. 105214731 U

(51) Int. Cl.
*H04L 12/10* (2006.01)
(52) U.S. Cl.
CPC .................................. *H04L 12/10* (2013.01)
(58) Field of Classification Search
CPC .... G06F 1/3296; G06F 1/263; G06F 13/4282; G06F 13/4022; H04L 12/10
USPC ............................................................ 307/1
See application file for complete search history.

(56) References Cited

U.S. PATENT DOCUMENTS

| 9,377,794 | B1* | 6/2016 | Dwelley | ................. | H04L 12/10 |
| 2011/0258466 | A1 | 10/2011 | Lee | | |
| 2013/0127481 | A1 | 5/2013 | Vladan | | |
| 2015/0277522 | A1 | 10/2015 | Kao | | |
| 2016/0054777 | A1* | 2/2016 | Dwelley | ............... | G06F 1/3206 |
| | | | | | 710/110 |

FOREIGN PATENT DOCUMENTS

| CN | 102263441 A | 11/2011 |
| TW | M397665 U | 2/2011 |
| TW | I487236 B | 6/2015 |
| TW | 201537911 A | 10/2015 |

OTHER PUBLICATIONS

Chinese Office Action dated Dec. 13, 2018, and Search Report dated Dec. 5, 2018, in a counterpart Chinese patent application, No. CN 201611051688.1.

* cited by examiner

*Primary Examiner* — Rexford N Barnie
*Assistant Examiner* — Swarna N Chowdhuri
(74) *Attorney, Agent, or Firm* — Chen Yoshimura LLP

(57) ABSTRACT

A system for preventing faulty connection between PoC and PoE. The system includes a signal generating circuit for generating a detection signal of a detection format of a powered device. A signal feedback circuit is configured to receive the detection signal, and to send a feedback signal to a power source equipment. A signal detecting circuit is configured to detect the feedback signal. A first control switch is coupled to the signal detecting circuit. A second control switch is coupled to the signal feedback circuit.

18 Claims, 4 Drawing Sheets

SYSTEM AND APPARATUS FOR PREVENTING FAULTY CONNECTION BETWEEN POC AND POE

BACKGROUND OF THE INVENTION

Field of the Invention

This invention relates to a power supply system, and in particular, it relates to a system and device that can prevent faulty connection between PoC and PoE.

Description of Related Art

Power over Ethernet (PoE) is a technology that can supply electrical power and transmit data to devices using the twisted pairs of an Ethernet. When transmitting data signals to IP-based terminal devices, PoE can supply DC power to these devices. PoE devices are divided into power source equipment (PSE) and powered device (PD). Standard PoE signaling uses voltage changes of the high voltage level signal of the transmission, to determine whether a receiving device is a PD; if it is, power is then supplied to it.

Power over Cable (PoC) is a technology using coaxial cables and based on superimposition of video signal, coaxial control and electrical power. It uses the same coaxial cable to both transmit high-definition video signal and coaxial signal, and transmit electrical power; i.e., high-definition video signal, coaxial signal etc. are superimposed together and transmitted over the same coaxial cable.

PoE uses network cables of Category 5 and above, to supply electrical power to the PD over the differential signal lines while transmitting digital network data. PoE typically uses one of two types of power supply methods. The first method uses 8-wire cables, where idle pins 4, 5, 6 and 7 are used to transmit electrical power. Data and electrical power are separated transmitted. The second mode uses 4-wire cables, and uses data pins 1 and 6 to transmit both electrical power and digital data, using superimposed transmission of signal and electrical power. PoC uses single pair transmission, i.e. using only two coaxial wires, so it has a simpler structure.

PoE transmits network data, using digital and networked transmission, and is reliable. Before using PoE transmission, the image is digitized, so it is more costly. It also experience network delay, and has a relatively short transmission range, which is up to 100 meters. PoC power supply system can save cost and shorten installation time, and has a longer transmission range, which is up to 400 meters. Both PoE and PoC power supply technologies achieve simultaneous transmission of video signal and electrical power signal.

Both PoE and PoC power supply systems have self-detection and matching functions. In a PoE system, the PSE first performs a matching detection for the PD, and only devices meeting the PoE power supply standard can pass the matching and be supplied electrical power. The PoC system also detects whether a device meets PoC standard in order to match the device for power supply. If the power receiving end has a fault, or the cable is damaged, power will be automatically cut off, preventing damage to the cable and the connected apparatus.

PoE technology can be used to supply electrical power to network phones, wireless base stations, networked video cameras, hubs, computers, etc. Because the devices can obtain electrical power from the Ethernet and do not need external power supply to function, it saves the time needed for configuring power lines, and lowers the cost of the overall system. Currently RJ-45 network connectors are used worldwide, so all PoE devices are compatible. This technology is often compared to conventional Plain Old Telephone Service (POTS) which also uses the same cable to receive electrical power as well as data (e.g. analog data). PoE technology can operate without having to modify the wiring configuration of the Ethernet. Thus, PoE systems not only save cost, but are also easy to configure wire installation. Moreover, they have the ability to remotely turn the power on and off.

In PoE systems, PSEs supply electrical power to PDs. In actual implementations, not all power supply ports of all PSEs on an Ethernet are connected to PDs. Although unused PSE power supply ports are in a dormant state, their corresponding chips and peripheral circuits still consume power.

PoE technology can provide electrical power and data via Ethernet cables to PDs such as IP phones, wireless network Access Point devices, networked surveillance cameras, etc. In a PoE network, the PSE can be connected to one or more PDs via Ethernet cables. One PSE can allocate power among one or more PDs and supply electrical power to the one or more PDs via Ethernet cables. An Ethernet cable includes four pairs of wires, each pair being a twisted pair of wires for transmitting differential signals. In some PoE networks, only two pairs among the four pairs of wires of the Ethernet cable are used to transmit electrical power to one or more PDs. However, it more and more common now to use the four pairs of wires to transmit electrical power to one or more PDs. By using more than two pairs of wires, the PoE network can support higher current, and at the same time reduce power loss on the cable.

In a PoE network, in the process of allocating electrical power to one or more PDs, the PSE can determine power loss, and based on the determination, budget the electrical power allocation among the one or more PDs. Because the power loss cannot be precisely determined, the PSE may estimate power loss, and based on the estimated power loss, stop power supply to one or more PDs in order to main the expected power efficiency of the PoE network. In another example, the PoE may imprecisely allocate less power to the one or more PDs based on a worst case scenario. In a PoE network, the resistance of the Ethernet cable is an important factor that causes power loss. Thus, the PSE needs to estimate the resistance of the cable in order to determine power loss. For example, time-domain reflectometers and the average resistance per unit length of the Ethernet cable can be used together to estimate the resistance of the Ethernet cable.

In addition, if a user inadvertently connects an end of a PoE network and an end of a PoC network, the connected devices may be damaged due to the different voltages used in these two networks.

SUMMARY

Accordingly, the present invention is directed to an improved electrical power supply system that substantially obviates one or more of the problems due to limitations and disadvantages of the related art.

An object of the present invention is to provide a system and device that can prevent inadvertent connection of a PoC network and a PoE network.

To achieve the above object and other objects, the present invention provides a system for preventing faulty connection between PoC and PoE. The system includes a signal generating circuit for generating a detection signal of a detection format of a powered device; a signal feedback circuit configured to receive the detection signal, and to send a feedback signal to a power source equipment; a signal detecting circuit configured to detect the feedback signal; a first control switch coupled to the signal detecting circuit; and a second control switch coupled to the signal feedback circuit.

In one aspect, the present invention provides a PoC (Power over Cable) system, which includes: a PoC power source equipment and a PoC powered device, adapted to be connected to each other by a transmission cable to communicate data between each other and to transmit electrical power from the PoC power source equipment to the PoC powered device; the PoC power source equipment including: a signal generating circuit configured to generate a detection signal having a power detection format of the PoC powered device and to transmit the detection signal to the PoC powered device; a signal detecting circuit configured to detect a feedback signal from the PoC powered device; and at least one first control switch electrically coupled to the signal detecting circuit; wherein the signal detecting circuit is configured to control the at least one first control switch to become conductive when the signal detecting circuit detects the feedback signal from the PoC powered device; and the PoC powered device including: a signal feedback circuit configured to receive from the PoC power source equipment the detection signal having the power detection format of the PoC powered device, and to transmit the feedback signal to the PoC power source equipment in response to receiving the detection signal; and at least one second control switch electrically coupled to the signal feedback circuit, wherein the signal feedback circuit is configured to control the at least one second control switch to become conductive in response to receiving the detection signal.

In another aspect, the present invention provides a PoC (Power over Cable) power source equipment configured to be connected to a transmission cable, which includes: a signal generating circuit configured to generate a detection signal having a power detection format of a PoC powered device, to be transmitted to the transmission cable; a signal detecting circuit configured to detect a feedback signal from the transmission cable; a first control switch and a second control switch electrically coupled to the signal detecting circuit, wherein the signal detecting circuit is configured to control the first control switch and the second control switch to become conductive when the signal detecting circuit detects the feedback signal; and a power supply isolation and voltage boost circuit electrically coupled to the first control switch and the second control switch, configured to supply electrical power to the transmission cable.

In yet another aspect, the present invention provides a PoC (Power over Cable) powered device, adapted to be connected to a transmission cable, which includes: a signal feedback circuit configured to receive from the cable a detection signal having a power detection format of the PoC powered device, and to transmit a feedback signal to the cable in response to receiving the detection signal having the power detection format of the PoC powered device; a first control switch and a second control switch electrically coupled to the signal feedback circuit, wherein the signal feedback circuit is configured to control the first control switch and the second control switch to become conductive in response to receiving the detection signal having the power detection format of the PoC powered device; and a power supply isolation and voltage step-down circuit, electrically coupled to the first control switch and the second control switch, configured to receive electrical power from the transmission cable.

Both the foregoing general description and the following detailed description are exemplary and explanatory and are intended to provide further explanation of the invention as claimed.

BRIEF DESCRIPTION OF THE DRAWINGS

The following drawings are to provide detailed descriptions to enable full understanding of the embodiments; they are intended to provide explanation of the invention and are do not limit the invention to specific embodiments.

DETAILED DESCRIPTION OF PREFERRED EMBODIMENTS

Embodiments of the present invention and their various aspects are described in detail below. These descriptions provide implementation details to enable a full understanding; they are illustrative and do not limit the scope of the invention. In addition to the embodiments described herein, the invention may be implemented in other embodiments. Specific embodiments are described below, and those skilled in the relevant art can readily understand the function and advantages of the invention based on these descriptions. Other embodiments are possible, and various details described herein can be applied based on practical needs, and various modifications may be made without departing from the spirit of the invention.

Each embodiments described in this disclosure refers to various related structures, methods or properties reflected in an embodiment. Implementations of one or more embodiments are not necessarily the same embodiments. Moreover, various structure, method or properties can be combined in one ore more embodiments.

Embodiments of the present invention provide a method that prevents connected devices from being damaged when PoC and PoE are inadvertently connected together.

Figure 1:
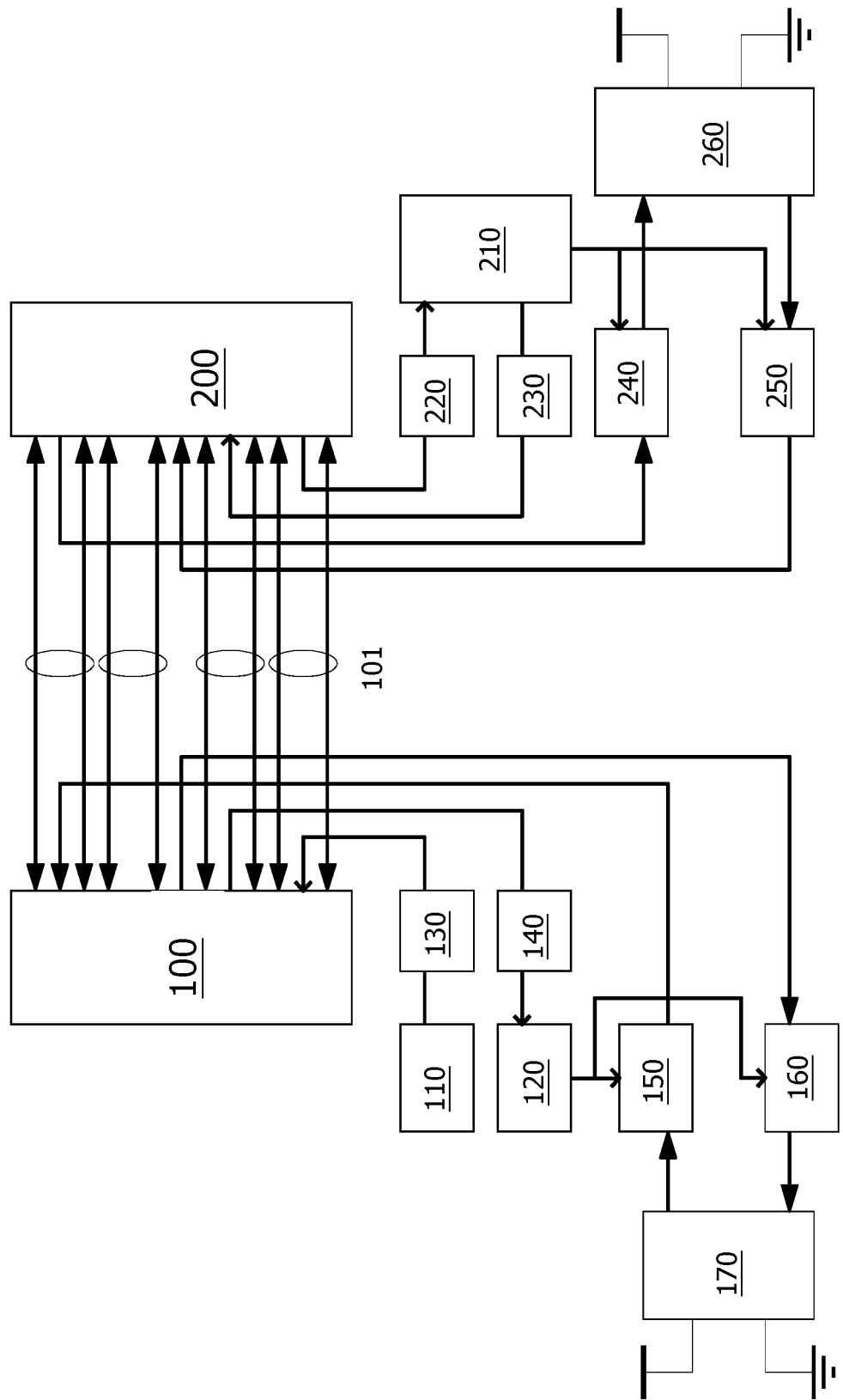
FIG. 1 schematically illustrates a PoC power source equipment (PSE) connected to a PoC powered device (PD) according to an embodiment of the present invention.

Refer to FIG. 1, which illustrates a PoC power source equipment (PSE) connected to a PoC powered device (PD) according to an embodiment of the present invention. In the system of this embodiment, (1) the PoC PSE includes a first transformer 100, a detection signal generating circuit 110, a signal detecting circuit 120, a high voltage capacitor 130, another high voltage capacitor 140, a control switch 150, another control switch 160, and a power supply isolation and voltage boost circuit 170. (2) The PoC PD includes a second transformer 200, a signal feedback circuit 210, a high voltage capacitor 220, another high voltage capacitor 230, a control switch 240, another control switch 250, and a power supply isolation and voltage step-down circuit 260. The detection signal generating circuit 110 is configured to generate a detection signal having the detection format of the PoC PD and transmit it to the PoC PD. The high voltage capacitor 130 is electrically coupled to the detection signal generating circuit 110, and the high voltage capacitor 140 is electrically coupled to the signal detecting circuit 120. The power supply isolation and voltage boost circuit 170 is electrically coupled to the control switch 150 and the control switch 160. The signal detecting circuit 120 is electrically coupled to the control switch 150 and the control switch 160. Further, the power supply isolation and voltage step-down circuit 260 is electrically coupled to the control switch 240 and the control switch 250. The signal feedback circuit 210 is electrically coupled to high voltage capacitor 220 and high voltage capacitor 230. The signal feedback circuit 210 is electrically coupled to control switch 240 and control switch 250. Moreover, the first transformer 100 is electrically coupled to the second transformer 200; the first transformer 100 is electrically coupled to the high voltage capacitor 130 and the high voltage capacitor 140, and the second transformer 200 is electrically coupled to the high voltage capacitor 220 and the high voltage capacitor 230. The signal feedback circuit 210 is configured to detect the detection signal generated by the detection signal generating circuit 110, and in response, to generate and transmit a feedback signal back to the PoC PSE. The signal detecting circuit 120 on the PSE is configured to detect the feedback signal transmitted by the signal feedback circuit 210.

It is well known that transformers are devices that boost or step down voltage based on Faraday's law of electromagnetic induction. Thus, the PoC power supply system of this embodiment can boost and step down voltage levels between the first transformer 100 and the second transformer 200. The power supply step is described below:

First, the detection signal generating circuit 110 generates a detection signal having a detection format of a PoC PD. The frequency pattern of this detection signal is determined by the type of device or equipment for which power is to be supplied. Thus, the format, frequency and voltage of this detection signal is not fixed, and can be adjusted or changed based on the different components, devices of equipment of the PD. For example, the detection signal may be an AC signal. The detection signal generated by the 110 is passed through the high voltage capacitor 130, and is sent to the first transformer 100. The detection signal is then transmitted from the first transformer 100 to the second transformer 200 via the cable 101. Then, it is passed through the high voltage capacitor 220 and then sent to the signal feedback circuit 210. The detection signal is detected by the signal feedback circuit 210, to determine whether the format or frequency matches the signal format or frequency set in the PoC PD. For example, the signal feedback circuit 210 may be a filter, such as an RLC circuit. Then, the signal feedback circuit 210 generates a feedback signal, and controls the control switches 240 and 250 to be conductive. The feedback signal is passed through the high voltage capacitor 230 and sent to the second transformer 200, and transmitted through the cable 101 to the first transformer 100. Then, the feedback signal is passed through the high voltage capacitor 140 and transmitted to the signal detecting circuit 120. The signal detecting circuit 120 is configured to detect the feedback signal. If the format or frequency of the feedback signal matches the format or frequency of the detection signal generated by the detection signal generating circuit 110, then it controls the control switches 150 and 160 to be conductive in order to transmit electrical power or signal from the power supply isolation and voltage boost circuit 170 to the first transformer 100. The electrical power or signal is sent to the first transformer 100, and transmitted through the cable 101 to the second transformer 200. Since the control switches 240 and 250 have been made conductive, the electrical power or signal is transmitted from the transformer 200 to the power supply isolation and voltage step-down circuit 260. On the other hand, if the format or frequency of the feedback signal does not match the format or frequency of the detection signal generated by the detection signal generating circuit 110, then the control switches 150 and 160 are not controlled to be conductive. Thus, the PoC PSE does not transmit electrical power or data.

High voltage capacitors typically refer to capacitors above 1 kV or 10 kV. Examples of high voltage capacitors include: high voltage ceramic capacitors, high voltage film capacitors, or high voltage polypropylene capacitors. The control switches 150, 160, 240 and 250 may be implemented by relays, power MOSFETs (metal-oxide field effect transistors), or other switching devices. Relays are electronic control devices used in automatic control circuits; the types of relays include: voltage relays, current relays, time relays, temperature relays, velocity relays, pressure relays, electromagnetic relays, inductive relays, electrical relays, electronic relays, thermal relays, optical relays, etc.

Figure 2:
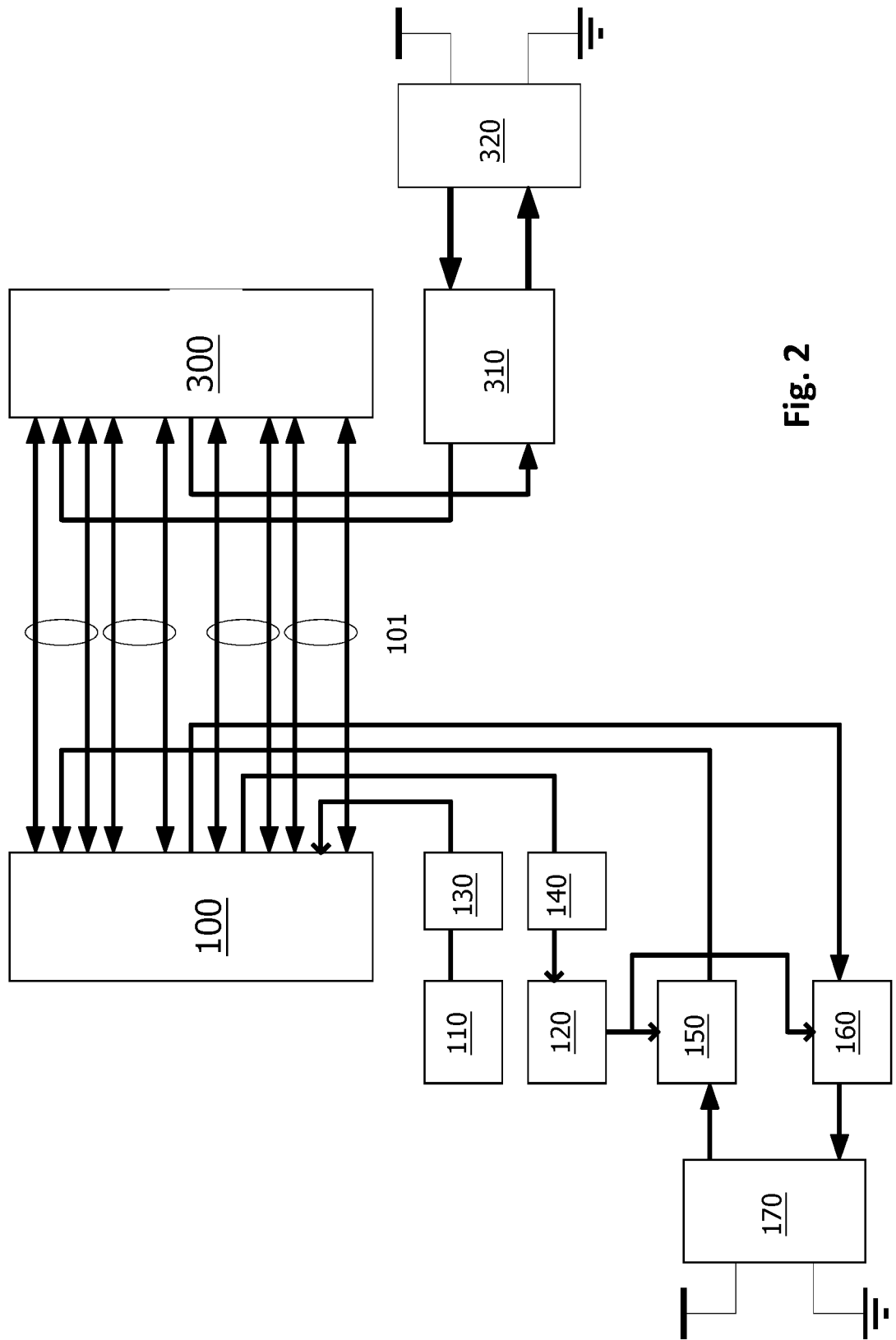
FIG. 2 schematically illustrates a PoC PSE connected to a PoE PSE according to an embodiment of the present invention.

Refer to FIG. 2, which illustrates a PoC PSE connected to a PoE PSE according to an embodiment of the present invention. In the system of this embodiment: (1) The PoC PSE includes a first transformer 100, a detection signal generating circuit 110, a signal detecting circuit 120, a high voltage capacitor 130, another high voltage capacitor 140, a control switch 150, another control switch 160, and a power supply isolation and voltage boost circuit 170. (2) The PoE PSE includes a third transformer 300, a PSE power supply system 310, and a power supply isolation circuit 320. The coupling of the components on the PoC PSE side is the same as in the earlier-described embodiment. The PSE power supply system 310 is electrically coupled to the third transformer 300 and the power supply isolation circuit 320. In this embodiment, the PoE PSE does not include a signal feedback circuit, so it does not generate a feedback signal to be detected by the signal detecting circuit 120. In other words, in this embodiment, because the PoE PSE does not have the detection signal feedback structure, it will not cause the control switches 150 and 160 on the PoC PSE side to become conductive.

Figure 3:
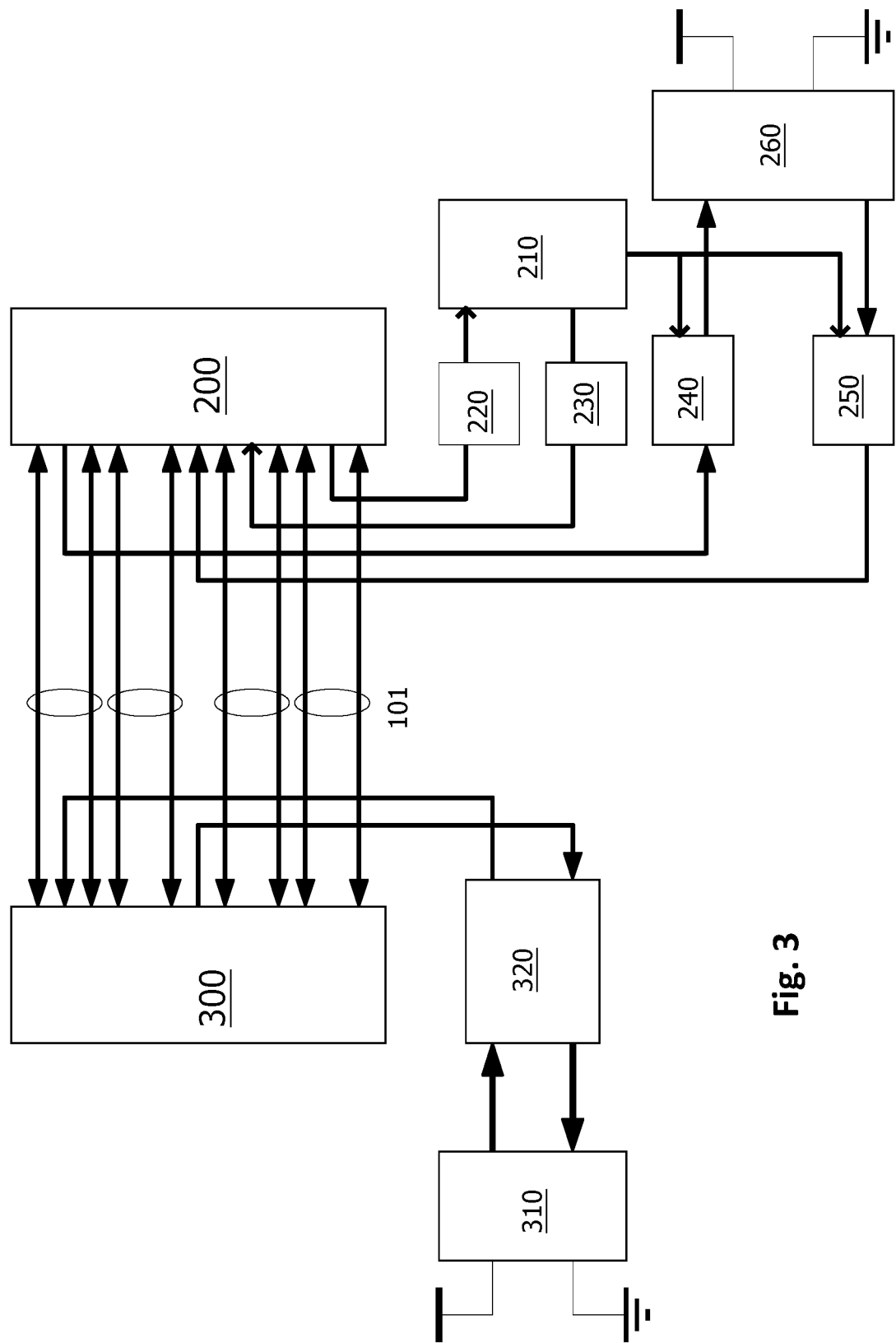
FIG. 3 schematically illustrates a PoE PSE connected to a PoC PD according to an embodiment of the present invention.

Refer to FIG. 3, which illustrates a PoE PSE connected to a PoC PD according to an embodiment of the present invention. In the system of this embodiment: (1) The PoE PSE includes a third transformer 300, a PSE power supply system 310, and a power supply isolation circuit 320. (2) The PoC PD includes a second transformer 200, a signal feedback circuit 210, a high voltage capacitor 220, another high voltage capacitor 230, a control switch 240, another control switch 250, and a power supply isolation and voltage step-down circuit 260. The coupling of the components on the PoE PSE side and the coupling of the components on the PoC PD side are the same as in the earlier-described embodiments. In this embodiment, the PoE PSE does not include a detection signal generating circuit or a signal detecting circuit, so it does not generate a detection signal for the PoC PD. In other words, in this embodiment, because the PoC PD does not receive the detection signal, it does not control the control switches 240 and 250 to become conductive and therefore does not transmit the power from the PoE PSE to the power supply system of the PoC PD side.

Figure 4:
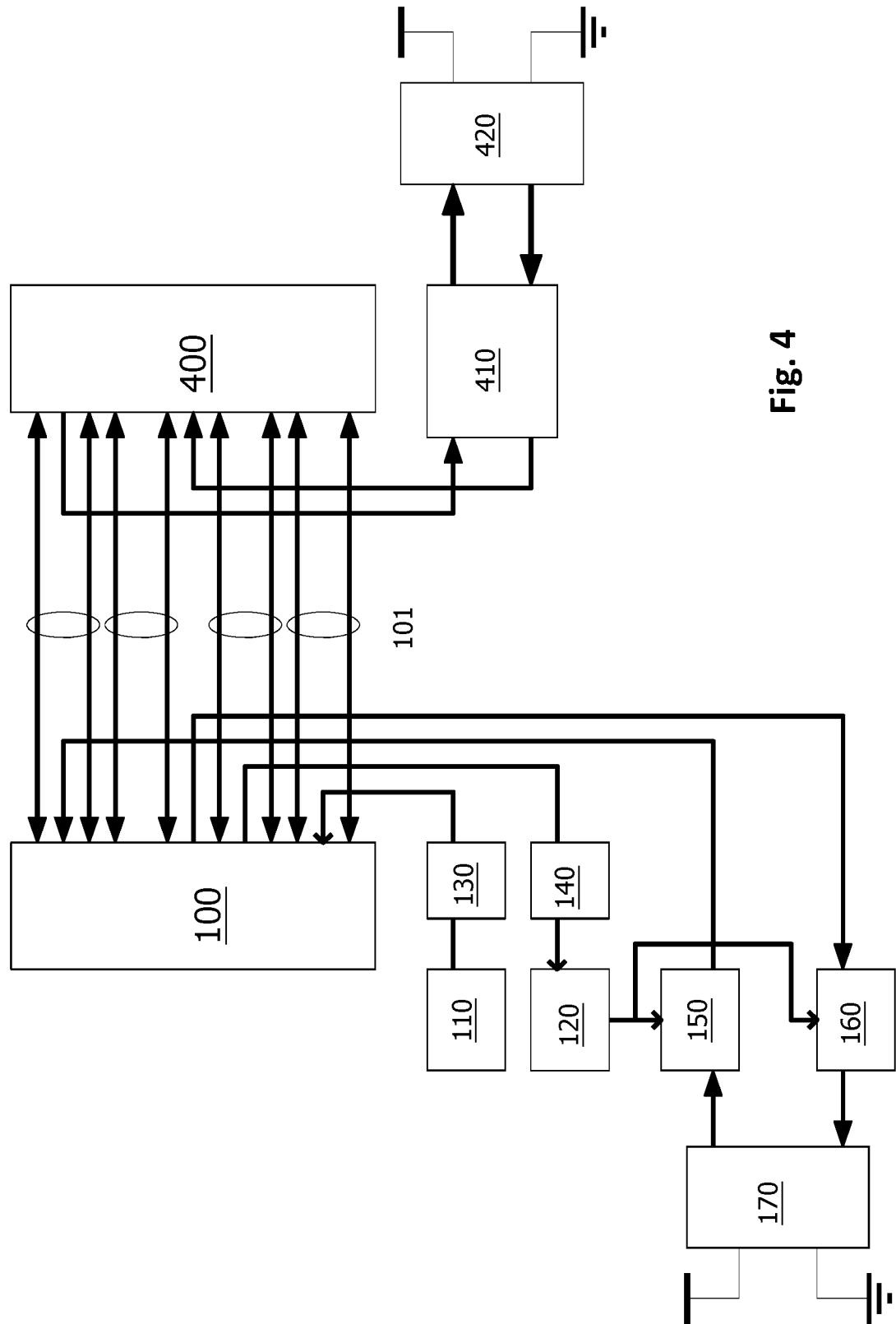
FIG. 4 schematically illustrates a PoC PSE connected to a PoE PD according to an embodiment of the present invention.

Refer to FIG. 4, which illustrates a PoC PSE connected to a PoE PD according to an embodiment of the present invention. In the system of this embodiment: (1) The PoC PSE includes a first transformer 100, a detection signal generating circuit 110, a signal detecting circuit 120, a high voltage capacitor 130, another high voltage capacitor 140, a control switch 150, another control switch 160, and a power supply isolation and voltage boost circuit 170. (2) The PoE PD includes a fourth transformer 400, a PD power reception system 410, and a power supply isolation and voltage step-down circuit 420. The coupling of the components on the PoC PSE side is the same as in the earlier-described embodiment. The PSE power reception system 410 is electrically coupled to the fourth transformer 400 and the power supply isolation and voltage step-down circuit 420. In this embodiment, the PoE PD does not include a signal feedback circuit, so it does not generate a feedback signal to be detected by the signal detecting circuit 120. In other words, in this embodiment, because the PoE PD does not have the detection signal feedback structure, it will not cause the control switches 150 and 160 on the PoC PSE side to become conductive.

Embodiments of the present invention can effectively solve the above-described problems of the conventional technology, and can achieve foolproof connection between PoC PSE/PD and PoE PSE/PD. Foolproof means that it can prevent mistakes, so that even if the user does not pay attention or is inexperienced, the user can still correctly complete the connection operation.

Thus, embodiments of the present invention have the following advantages:

(1) It can achieve a remote power supply system using relative low-cost PoC architecture;

(2) It can prevent user mistakenly connecting PoC PSE and PoE PSE;

(3) It can increase the selection options for PSE/PD devices, and reduce product size;

(4) It provides more flexible combinations of products, and achieves foolproof installation of PoC PSE/PD and PoE PSE/PD; and (5) By using a remote side signal loop back mechanism, it protects against inadvertent misconnection of different types of power supplies.

Preferred embodiments of the present invention are described above. It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. A PoC (Power over Cable) system, comprising:
a PoC power source equipment and a PoC powered device, adapted to be connected to each other by a transmission cable to communicate data between each other and to transmit electrical power from the PoC power source equipment to the PoC powered device;
the PoC power source equipment comprising:
a signal generating circuit configured to generate a detection signal having a detection format of the PoC powered device, the detection format including a predefined frequency pattern, and to transmit the detection signal to the PoC powered device;
a signal detecting circuit configured to detect a feedback signal from the PoC powered device and to determine whether the feedback signal has a format that matches the detection format of the PoC powered device; and
at least one first control switch electrically coupled to the signal detecting circuit;
wherein the signal detecting circuit is configured to control the at least one first control switch to become conductive in response to the signal detecting circuit detecting the feedback signal from the PoC powered device and determining that the feedback signal has the format that matches the detection format of the PoC powered device; and
the PoC powered device comprising:
a signal feedback circuit configured to receive from the PoC power source equipment the detection signal and to determine whether the detection signal has the detection format of the PoC powered device, and to transmit the feedback signal to the PoC power source equipment in response to receiving the detection signal and determining that the detection signal has the detection format of the PoC powered device; and
at least one second control switch electrically coupled to the signal feedback circuit,
wherein the signal feedback circuit is configured to control the at least one second control switch to become conductive in response to receiving the detection signal and determining that the detection signal has the detection format of the PoC powered device.

2. The PoC system of claim 1, wherein the PoC power source equipment further comprises a power supply isolation and voltage boost circuit electrically coupled to the at least one first control switch, configured to supply electrical power to the PoC powered device via the transmission cable.

3. The PoC system of claim 2, wherein the at least one first control switch include two first control switches.

4. The PoC system of claim 1, wherein the PoC power source equipment further comprises a first high voltage capacitor electrically coupled to the signal generating circuit, and a second high voltage capacitor electrically coupled to the signal detecting circuit.

5. The PoC system of claim 1, wherein the PoC powered device further comprises a power supply isolation and voltage step-down circuit electrically coupled to the at least one second control switch, configured to receive electrical power from the transmission cable.

6. The PoC system of claim 5, wherein the at least one second control switch include two second control switches.

7. The PoC system of claim 1, wherein the PoC powered device further comprises a first high voltage capacitor electrically coupled to the signal feedback circuit, and a second high voltage capacitor electrically coupled to the signal feedback circuit.

8. The PoC system of claim 1, wherein the PoC power source equipment further comprises a first transformer and the PoC powered device further comprises a second transformer, the first and second first transformers configured to be electrically coupled to each other by the transmission cable,
wherein the PoC power source equipment further comprises a first high voltage capacitor and a second high voltage capacitor electrically coupled to the first transformer, and the PoC powered device further comprises a third high voltage capacitor and a fourth high voltage capacitor electrically coupled to the second transformer.

9. A PoC (Power over Cable) power source equipment configured to be connected to a transmission cable, comprising:
a signal generating circuit configured to generate a detection signal having a detection format of a PoC powered device, the detection format including a predefined frequency pattern, to be transmitted to the transmission cable;

a signal detecting circuit configured to detect a feedback signal from the transmission cable and to determine whether the feedback signal has a format that matches the detection format of the PoC powered device;

a first control switch and a second control switch electrically coupled to the signal detecting circuit, wherein the signal detecting circuit is configured to control the first control switch and the second control switch to become conductive in response to the signal detecting circuit detecting the feedback signal and determining that the feedback signal has the format that matches the detection format of the PoC powered device; and a power supply isolation and voltage boost circuit electrically coupled to the first control switch and the second control switch, configured to supply electrical power to the transmission cable.

10. The PoC power source equipment of claim 9, further comprising a first high voltage capacitor electrically coupled to the signal generating circuit, and a second high voltage capacitor electrically coupled to the signal detecting circuit.

11. The PoC power source equipment of claim 9, further comprising a transformer configured to be electrically coupled to the transmission cable, the transformer being electrically coupled to the first high voltage capacitor, the second high voltage capacitor, the first control switch and the second control switch.

12. The PoC power source equipment of claim 9, wherein each of the first control switch and the second control switch is a relay or a power MOSFET (metal-oxide field effect transistors).

13. A PoC (Power over Cable) powered device, adapted to be connected to a transmission cable, comprising:

a signal feedback circuit configured to receive from the cable a detection signal and to determine whether the detection signal has a detection format of the PoC powered device, the detection format including a predefined frequency pattern, and to transmit a feedback signal to the cable in response to receiving the detection signal and determining that the detection signal has the detection format of the PoC powered device;

a first control switch and a second control switch electrically coupled to the signal feedback circuit, wherein the signal feedback circuit is configured to control the first control switch and the second control switch to become conductive in response to receiving the detection signal and determining that the detection signal has the detection format of the PoC powered device; and a power supply isolation and voltage step-down circuit, electrically coupled to the first control switch and the second control switch, configured to receive electrical power from the transmission cable.

14. The PoC powered device of claim 13, further comprising a first high voltage capacitor electrically coupled to the signal feedback circuit, and a second high voltage capacitor electrically coupled to the signal feedback circuit.

15. The PoC powered device of claim 14, further comprising a transformer configured to be electrically coupled to the transmission cable, the transformer being electrically coupled to the first high voltage capacitor, the second high voltage capacitor, the first control switch and the second control switch.

16. The PoC powered device of claim 13, wherein each of the first control switch and the second control switch is a relay or a power MOSFET (metal-oxide field effect transistors).

17. The PoC system of claim 1, wherein the detection signal is an AC signal with a predefined frequency, and wherein the signal feedback circuit of the PoC powered device includes an RLC filter circuit.

18. The PoC powered device of claim 13, wherein the detection signal is an AC signal with a predefined frequency, and wherein the signal feedback circuit includes an RLC filter circuit.

* * * * *